(12) United States Patent
Poon et al.

(10) Patent No.: US 10,484,034 B2
(45) Date of Patent: *Nov. 19, 2019

(54) TABLET COMPUTER CASE

(71) Applicant: GRIFFIN TECHNOLOGY, LLC, Irvine, CA (US)

(72) Inventors: Daniel Poon, Nashville, TN (US); Tony Ray Plunk, Fairview, TN (US)

(73) Assignee: Griffin Technology, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,940

(22) Filed: Nov. 7, 2018

(65) Prior Publication Data

US 2019/0074858 A1 Mar. 7, 2019

Related U.S. Application Data

(63) Continuation of application No. 15/809,859, filed on Nov. 10, 2017, now Pat. No. 10,128,888, which is a continuation of application No. 15/392,303, filed on Dec. 28, 2016, now Pat. No. 9,838,063, which is a continuation of application No. 15/095,711, filed on Apr. 11, 2016, now Pat. No. 9,571,149.

(60) Provisional application No. 62/145,064, filed on Apr. 9, 2015.

(51) Int. Cl.
*H04B 1/3877* (2015.01)
*H04B 1/3888* (2015.01)
*A45C 11/00* (2006.01)

(52) U.S. Cl.
CPC ............ *H04B 1/3877* (2013.01); *A45C 11/00* (2013.01); *H04B 1/3888* (2013.01); *A45C 2011/002* (2013.01); *A45C 2011/003* (2013.01); *A45C 2200/15* (2013.01)

(58) Field of Classification Search
CPC ..... H04B 1/3877; H04B 1/3888; A45C 11/00; A45C 2200/15; A45C 2011/003; A45C 2011/002
USPC ............................................. 455/575.1–575.8
See application file for complete search history.

(56) References Cited

U.S. PATENT DOCUMENTS

| | | | |
|---|---|---|---|
| 2002/0088918 A1* | 7/2002 | Uto | F16M 11/10 248/688 |
| 2005/0264988 A1* | 12/2005 | Nicolosi | G06F 1/1626 361/679.44 |
| 2011/0074257 A1* | 3/2011 | Li | F16M 11/10 312/223.1 |
| 2012/0125791 A1* | 5/2012 | Parker | F16M 11/10 206/45.2 |

(Continued)

*Primary Examiner* — Michael Y Mapa

(57) ABSTRACT

A device case for a portable electronic device includes a device stand attached to a hack surface of the case housing. The device stand is formed by an inner stand and outer stand connected by releasable hinged connections to the back surface of the case housing. A track is formed on a surface of the outer stand that the inner stand slides along. A locking portion such as a cavity or channel on the outer stand locks the inner stand into an open position with respect to the outer stand. At least a portion of the outer stand is flexible such that applying a threshold pressure to the device case causes the portion of the outer stand to flex such that the locking portion releases the inner and outer stand from the open position without damaging the stand.

18 Claims, 5 Drawing Sheets

(56) References Cited

U.S. PATENT DOCUMENTS

2014/0262854 A1* 9/2014 Chen ........................ A45C 11/00
                                                         206/45.24
2014/0332418 A1* 11/2014 Cheung .................. F16M 11/10
                                                         206/45.2
2015/0349830 A1* 12/2015 Lai ........................ H04B 1/3888
                                                         455/575.4

* cited by examiner

TABLET COMPUTER CASE

INCORPORATION BY REFERENCE TO RELATED APPLICATIONS

This application is continuation of U.S. patent application Ser. No. 15/809,859, filed Nov. 10, 2017, which is continuation of U.S. patent application Ser. No. 15/392,303, filed Dec. 28, 2016, which is continuation of U.S. patent application Ser. No. 15/095,711, filed Apr. 11, 2016, which claims benefit under 35 U.S.C. § 119(e) from U.S. Provisional Application No. 62/145,064, filed Apr. 9, 2015, the contents of which are hereby incorporated by reference in their entirety.

BACKGROUND OF THE INVENTION

Protective device cases are often used to protect mobile phone and tablet computers. Some of these protective cases have built in stands that allow the device to be supported at an angle on a flat surface. Typically, these stands have fold out legs that support the device. Unfortunately, when pressure is applied to the device case with the stand legs extended, the legs tend to break off destroying the functionality of the case. Therefore, what is needed is an improved protective device case with an incorporated stand.

SUMMARY OF THE INVENTION

A device case for a portable electronic device includes a case housing that encloses the portable electronic device. A device stand is attached to a back surface of the case housing. The device stand is constructed from an inner and outer stand connected by hinged connections to the back surface of the case housing. The inner stand and outer stand are preferably connected to the back surface of the device case by a releasable hinged connection such that the inner and outer stand can separate from the device case without breaking. The inner stand is most preferably connected to the back surface of the device case by hinge protrusions on the inner stand that are inserted into hinge holes in the back surface of the device ease such that the inner stand can separate from the device case without breaking. The outer stand is most preferably connected to the back surface of the device case by compressible protrusions that engage hinge slots on the back surface of the device case such that the outer stand can separate from the device case without breaking. A track is formed on a surface of the outer stand and the inner stand slides along the track. A locking portion on the outer stand locks the inner stand into an open position with respect to the outer stand. The locking portion can be a channel into which a portion of the inner stand rests or bumps on a surface of the outer stand that form a cavity into which a portion of the inner stand rests. At least a portion of the outer stand is flexible such that applying a threshold pressure to the device case causes the portion of the outer stand to flex such that the locking portion releases the inner stand and the outer stand from the open position. The outer stand can have slots which allow a portion of the outer stand to flex and release the inner stand and the otter stand from the open position.

DETAILED DESCRIPTION OF THE PREFERRED EMBODIMENT

The present protective device case design has a number of novel features that distinguish it from prior mobile electronics device cases. The features generally relate to a stand on the back of the case having "fail-safe" locking mechanisms that disengage under a threshold amount of pressure such that the components of the stand are not broken when excessive pressure is applied and can easily be reassembled.

Figure 1:
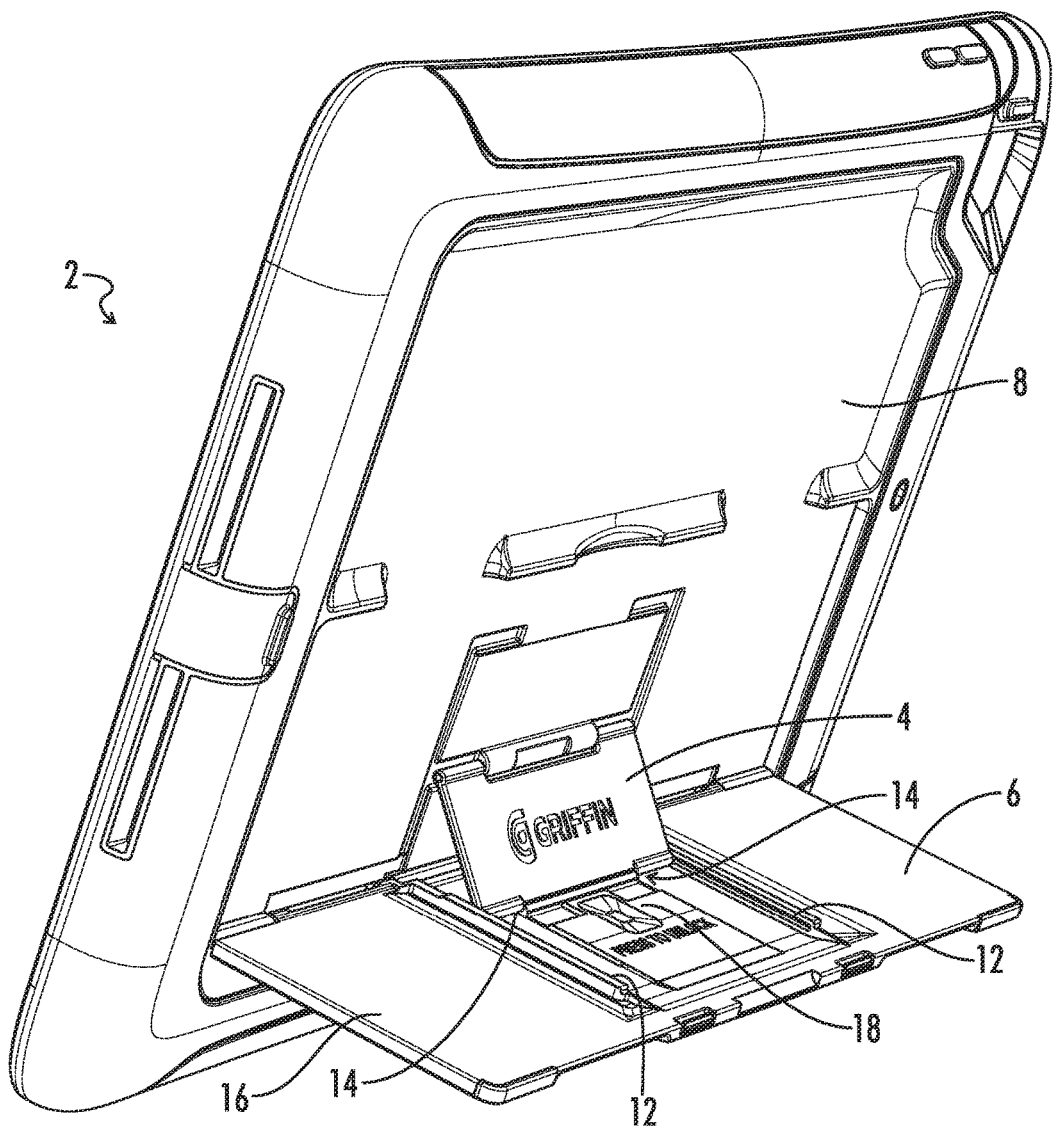
FIG. 1 is an illustration of a back view of a protective device case constructed in accordance with an embodiment of the present invention, with the stand locked in the open position.

Referring now to FIG. 1, an illustration of a back view of a protective device case 2 constructed in accordance with an embodiment of the present invention with the stand locked in the open position is shown. The case 2 includes an inner stand 4 and an outer stand 6 which are hinged to a back surface 8 of the case 2 that encloses a mobile electronic device. The inner stand 4 slides along tracks 12 formed on an inside surface of the outer stand 6, allowing the inner 4 and outer stand 6 to alternate between a closed position and an open position.

In the open position, the inner stand 4 rests in channels 14 on the inside surface 16 of the outer stand 6 which lock the inner stand 4 in place during use. When a threshold amount of force is exerted on an unlock mechanism 18 or the device case 2 itself, two slots 42 and 44, discussed and illustrated in more detail below with respect to FIG. 4, formed in the outer stand 6 allow the locking portion 18 to flex downward thereby releasing the inner stand 4 from the channels 14 and closing the stand before the exerted pressure breaks the structure of the stand itself.

Figure 2:
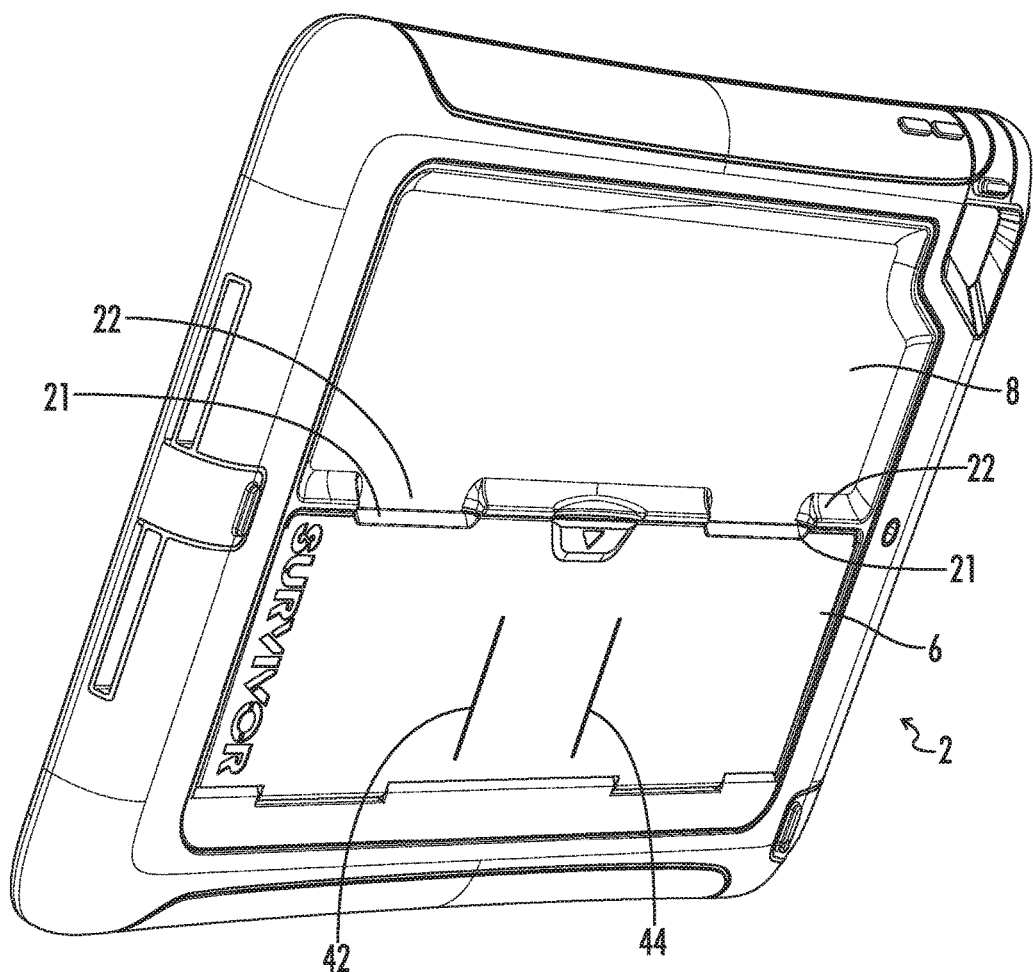
FIG. 2 is an illustration of a back view of the protective device case of FIG. 1 with the stand closed.
Figure 3:
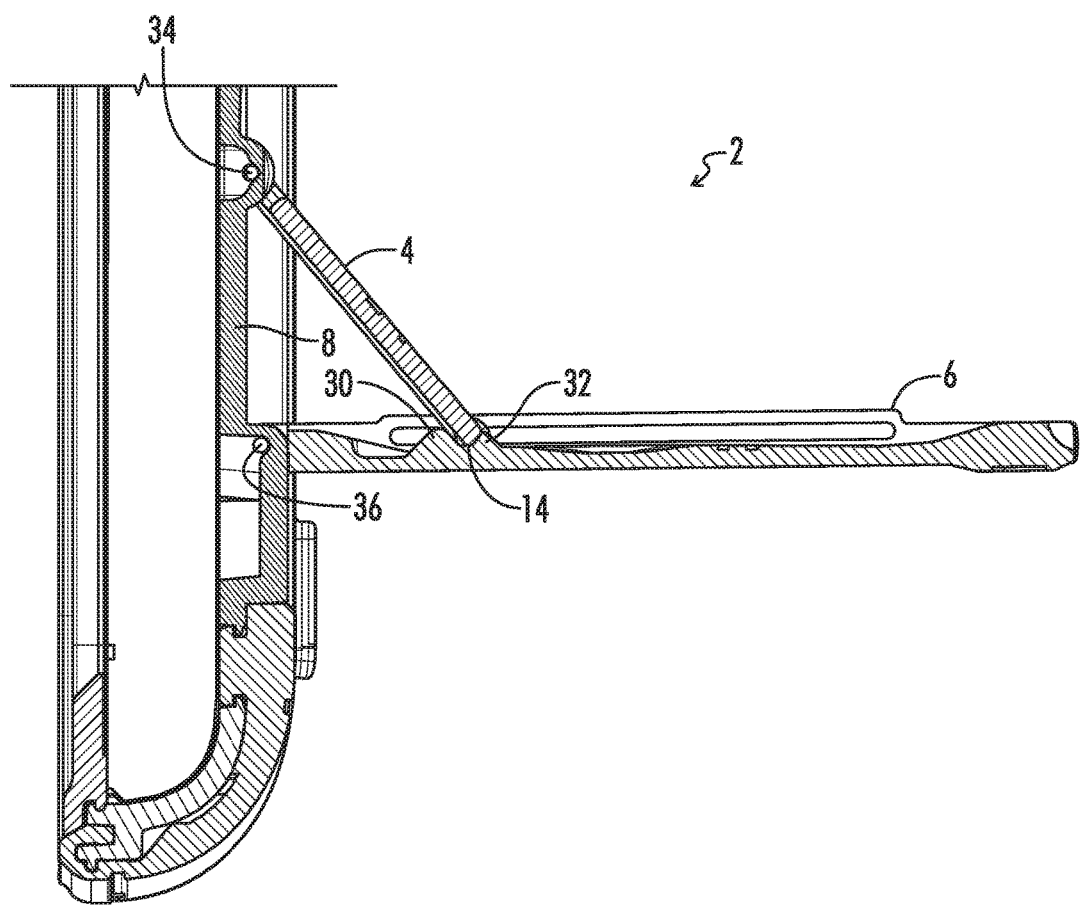
FIG. 3 is an illustration of a cross sectional side view of the device case of FIG. 1.

FIG. 2 is an illustration of a back view of the protective device case 2 of FIG. 1 with the stand closed. To close the stand, a user simply applies a threshold pressure to the device case 2 which causes the stand to automatically collapse and release from the open position. The inner stand 4 folds under the outer stand 6. Connectors 21 on the edge of the outer stand 6 snap onto projections 22 on the back surface 8 of the case 2 such that both the inner stand 4 and the outer stand 6 are secured against the case back in the closed position.

Referring now to FIG, 3, an illustration of a cross sectional side view of the device case of FIG. 1 is shown. The outer stand 6 has bumps 30 and 32 that form a channel 14 that the edge of the inner stand 4 rests in when the stand is in the open position. The bumps 30 and 32 function as a locking mechanism which locks the inner stand 4 into position with respect to the outer stand 6. The inner stand 4 and outer stand 6 are connected to the back surface 8 of the device case 2 with hinged connections 34 and 36 that allow them to pivot about the connections.

Figure 4:
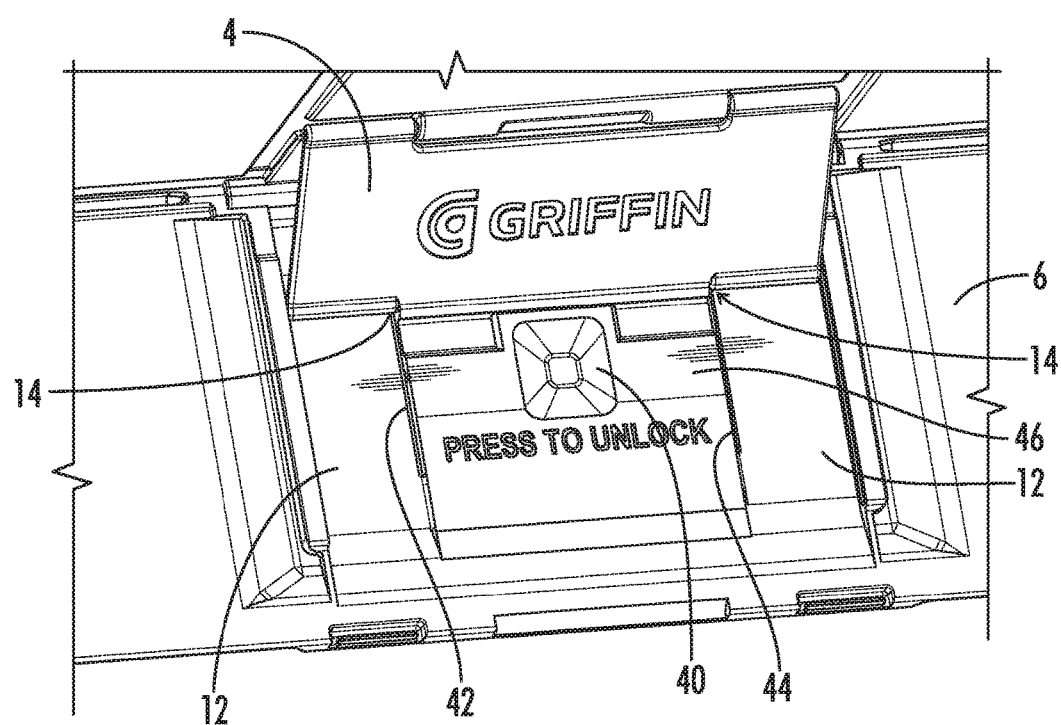
FIG. 4 is an illustration of a close up view of the inner and outer stand of the device ease of FIG. 1.

Referring now to FIG. 4, an illustration of a close up view of the inner 4 and outer stand 6 of the device case 2 of FIG. 1 is shown. An unlock button 40 is formed on the surface of outer stand 4. Slots 42 and 44 are formed in the outer stand 6 which allow the locking portion 46 to flex downward and release the inner stand 4 from the channels 14 in the slidable tracks 12 of the outer stand 6 and, thus, disengage the stand from the open position.

FIGS. 5(A)-5(D) are illustrations of the preferred releasable friction fit hinges of a protective device case constructed in accordance with an embodiment of the present invention. Both the hinges 50 and 52 of the inner stand 4 and the hinges 54 and 56 of the outer stand 6 are friction fit connections that are designed to release from the device case when a threshold level of force is applied to the hinges. The breakaway, friction fit hinges 50, 52, 54 and 56 prevent forces applied from the side, which do not force the inner stand out of the locking channels, from causing the structure of the inner stand 4 or outer stand 6 to break.

Figure 5A:
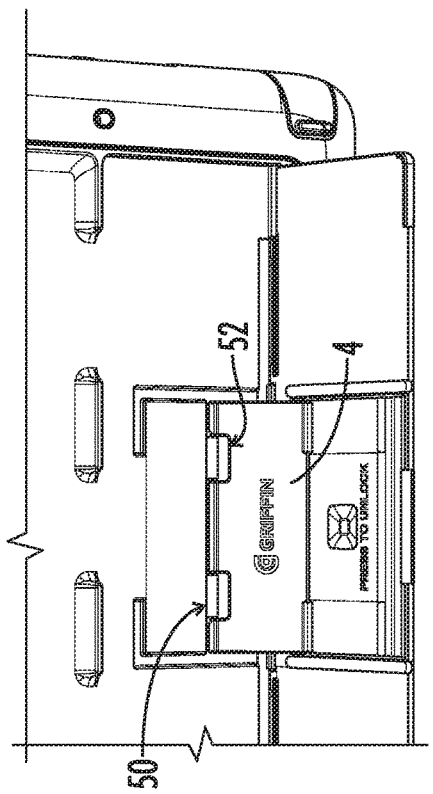
FIGS. 5(A)-5(D) are illustrations of the releasable friction fit hinges of a protective device case constructed in accordance with an embodiment of the present.
Figure 5B:
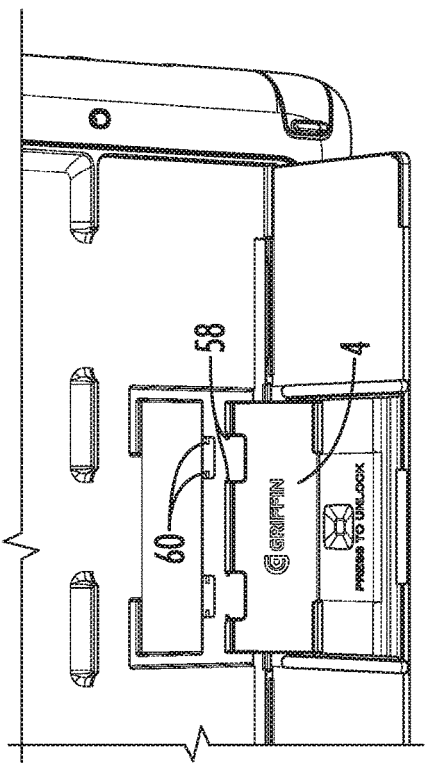

FIG. 5(A) shows the friction fit hinges 50 and 52 of the inner stand 4 connected to the back panel of the device case. FIG. (B) shows the friction fit hinges 50 and 52 of the inner stand 4 disengaged from the back panel of the device case. The inner stand hinges consist of hinge protrusions 58 on the inner stand 4 that fit in hinge holes 60 on the case back. The inner stand 4 is constructed from a flexible plastic such that, when pressure is applied, even a twisting pressure, the hinge protrusions 58 disengage from the hinge holes 60 and release the inner stand 4 from the case. Once removed, the inner stand 4 can be simply snapped back on the case by pushing the hinged protrusions 58 back into the hinge holes 60 by flexing edges of the flexible inner stand.

Figure 5C:
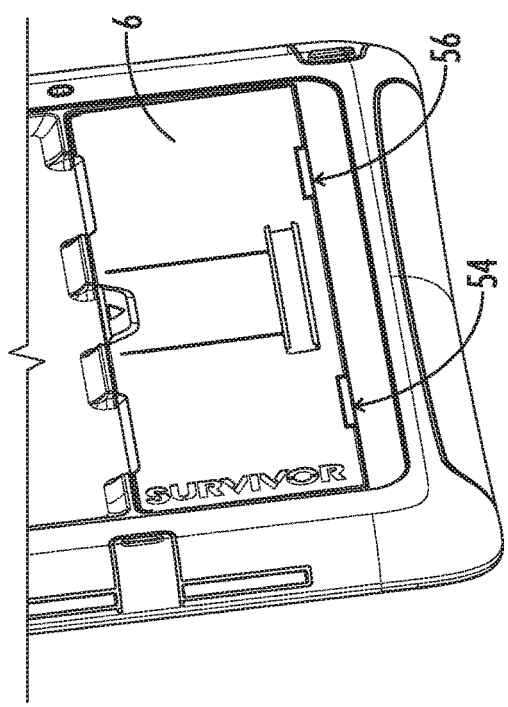
Figure 5D:
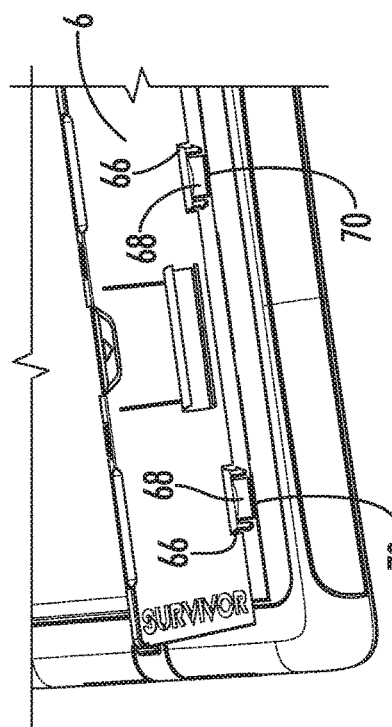

FIG. 5(C) shows the friction fit hinges 54 and 56 of the outer stand 6 connected to the back panel of the device case. FIG. 5(D) shows the friction fit hinges 54 and 56 of the outer stand 6 disengaged from the back panel of the device case. The outer stand hinges 54 and 56 consist of hinge pins 66 attached to compressible protrusions 68 that fit in securely into hinge slots 70 in the case back. The compressible protrusions 68 friction fit in the hinge slots 70 is such that, when a threshold pressure is applied, even a twisting pressure, the compressible protrusions 68 disengage from the hinge slots 70 and release the outer stand 6 from the case. Once removed, the compressible protrusions 68 can simply be pressed back into the hinge slots 70 to reengage the outer stand 6 to the case back.

Although there have been described particular embodiments of the present invention of a new and useful Tablet Computer Case, it is not intended that such references be construed as limitations upon the scope of this invention except as set forth in the following claims.

What is claimed is:

1. A device case for a portable electronic device, the device case comprising:
   a housing having a back surface, the back surface having hinge holes and hinge slots;
   an inner stand connected to the back surface by hinge protrusions on the inner stand that are inserted into the hinge holes;
   an outer stand connected to the back surface by compressible protrusions that engage said hinge slots such that the outer stand can separate from the device case without breaking, at least a portion of the outer stand is flexible such that applying a threshold pressure to the device case causes the flexible portion to flex; and
   a locking portion formed on the outer stand that locks the inner stand into an open position with respect to the outer stand, wherein the locking portion releases the inner stand and the outer stand from the open position when the threshold pressure is applied.

2. The device case of claim 1, wherein the locking portion further comprises a channel into which a portion of the inner stand rests.

3. The device case of claim 2, wherein the outer stand comprises bumps that form the channel.

4. The device case of claim 3, wherein the bumps lock the inner stand into position with respect to the outer stand.

5. The device case of claim 1 further comprising at least one slot positioned in the outer stand, wherein said at least one slot allows a portion of the outer stand to flex and release the inner stand and the outer stand from the open position.

6. A device case for a portable electronic device, the device case comprising:
   a housing having a back surface;
   an inner stand connected to the back surface by a first hinged connection;
   an outer stand connected to the back surface by a second hinged connection, at least a flexible portion is positioned on the outer stand;
   an unlock button formed on the outer stand; and
   a locking portion formed on the outer stand, the locking portion comprises bumps on a surface of the outer stand that form a channel into which a portion of the inner stand can rest and to lock the inner stand into an open position with respect to the outer stand, wherein when a threshold pressure is applied to the unlock button the flexible portion of the outer stand flex downward such that the locking portion releases the inner stand and the outer stand from the open position.

7. The device case of claim 6 further comprising at least one slot positioned in the outer stand, wherein said at least one slot allows a portion of the outer stand to flex and release the inner stand and the outer stand from the open position.

8. The device case of claim 6, wherein the inner stand is connected to the back surface of the device case by hinge protrusions on the inner stand that are inserted into hinge holes in the back surface such that the inner stand can separate from the device case without breaking.

9. The device case of claim 6, wherein the first hinged connection is a releasable hinged connection such that the inner stand can separate from the device case without breaking.

10. The device case of claim 6, wherein the second hinged connection is a releasable hinged connection such that the outer stand can separate from the device case without breaking.

11. A device case for a portable electronic device, the device case comprising:
    a housing having a back surface;
    an inner stand connected to the back surface by a first hinged connection;
    an outer stand connected to the back surface by a second hinged connection;
    a locking portion formed on the outer stand that locks the inner stand into an open position with respect to the outer stand;
    an unlock button formed on the surface of the outer stand; and
    a slot positioned in the outer stand allowing a portion of the outer stand to flex downward and release the inner stand and the outer stand from the open position.

12. The device case of claim 11, wherein the locking portion further comprises a channel into which a portion of the inner stand rests.

13. The device case of claim 12, wherein the outer stand comprises bumps that form the channel.

14. The device case of claim 13, wherein the bumps lock the inner stand into position with respect to the outer stand.

15. The device case of claim 11, wherein the locking portion further comprises bumps on a surface of the outer stand that form a cavity into which a portion of the inner stand rests.

16. The device case of claim 11, wherein at least a portion of the outer stand is flexible such that applying a threshold pressure to the unlock button causes the portion of the outer stand to flex downward such that the locking portion releases the inner stand and the outer stand from the open position.

17. The device case of claim 11, wherein the inner stand is connected to the back surface of the device case by hinge protrusions on the inner stand that are inserted into hinge holes in the back surface such that the inner stand can separate from the device case without breaking.

18. The device case of claim 11 further comprises a second slot positioned in the outer stand allowing a portion of the outer stand to flex downward and release the inner stand and the outer stand from the open position.

* * * * *